June 4, 1963 E. G. KAMMERER 3,091,903
RECEPTACLE FILLING APPARATUS
Filed Feb. 16, 1960 11 Sheets-Sheet 4

INVENTOR.
EDWIN G. KAMMERER
BY
Paul A. Weilein
ATTORNEY

June 4, 1963

E. G. KAMMERER 3,091,903

RECEPTACLE FILLING APPARATUS

Filed Feb. 16, 1960

INVENTOR.
EDWIN G. KAMMERER
BY
Paul A. Weilein
ATTORNEY.

Fig. 13.

INVENTOR.
EDWIN G. KAMMERER
BY
Paul A. Weilein
ATTORNEY.

United States Patent Office 3,091,903
Patented June 4, 1963

3,091,903
RECEPTACLE FILLING APPARATUS
Edwin G. Kammerer, Stockton, Calif., assignor to Storrac, Inc., Los Angeles, Calif., a corporation of California
Filed Feb. 16, 1960, Ser. No. 9,030
39 Claims. (Cl. 53—260)

The present invention relates to bagging or receptacle filling machines, and more particularly to a machine which is especially adapted for but not limited to the bagging of produce such as carrots in plastic bags so as to facilitate the marketing thereof.

It is the common practice to market top grade produce in plastic bags for ease of customer handling, and the present invention contemplates a machine which significantly facilitates the filling of bags with carrots or other produce in a simple and efficient manner so as to reduce the cost of handling the carrots while substantially enlarging the volume of carrots or other produce which may be bagged in a given length of time and with a minimum amount of personal attention.

Among the objects of the invention is the provision of a machine including bag supporting and carrot receiving and dumping hopper devices which are cyclically and successively operated so as to receive a bag and support the bag at the lower end of the hopper device and thereafter be conditioned to receive a quantity of carrots or other produce from a feed conveyor, which produce ultimately is dumped or dispensed into the bag supported upon the hopper and discharged in the bag from the apparatus with a minimum of handling.

In accordance with the preceding object, it is a further and more specific object to provide a novel article receiving hopper assembly which is adapted to be cyclically operated as aforesaid and which is particularly well suited to support a plastic or other bag thereon for receiving articles passing through the hopper.

Another object is to provide such a machine wherein the novel hopper means aforesaid is cyclically operated by a series of cam tracks or rails disposed in the path of the hopper device so as to condition the receiver or the hopper device for the reception of produce or other articles to be bagged, and to subsequently dump the produce into the bag and then release the bag from the hopper for final disposition; thereafter the hopper is conditioned to receive another bag as the cycle is repeated.

Another object is to provide a machine in accordance with the foregoing wherein any hopper which inadvertently has not had a bag placed thereon for reception of articles to be bagged is opened so that articles in such hopper will not be transferred to and released from the hopper at a subsequent station during the cyclical operation of the hopper mechanism.

Another object is to provide a machine as aforesaid wherein the receiver of the hopper assembly is dumped to fill the bag on the hopper with a jogging action so as to assure the proper displacement of all articles from the hopper receiver.

Yet another object is to provide a machine wherein the bags containing articles are jogged to settle the articles in the bag prior to release of the bag from the hopper assembly.

A further object is to provide a machine in accordance with the foregoing wherein the bags are positively and effectively retained on the hopper during the dumping of the receiver of the hopper so that the bags will not be inadvertently displaced from the hopper due to the sudden loading thereof with articles.

In carrying the foregoing as well as other objects into practice, the invention contemplates a machine in which a hopper having an article receiver and bag supporting means cyclically traverses a bag applying station whereat plastic or other bags may be manually or otherwise applied to the hopper and supported thereby, the hopper assembly then passing to a station whereat the receiver is conditioned or set so as to receive articles to be bagged when the hopper unit passes to a feeding station whereat successive hopper assembly receivers are filled with articles to be bagged by a feed or supply conveyor. As the hopper assembly progresses in its circuit the receivers are subjected to the mild levelling effect of rotating flexible blades so as to arrange the articles and remove any excess articles projecting above a predetermined level, as by pushing such articles into an adjacent receiver. As the hopper assembly progresses further, it passes an arranging station whereat excess carrots may be manually removed in those instances where the feeding means or levelling means has not been successful in levelling off the articles in the receiver. As the hopper unit progresses further, the receiver is dumped with a jogging action to assure the discharge of articles therefrom into the bag supported by the hopper, following which the bag is jogged to effect proper settling of the articles therein and the bag is then discharged from the hopper, preferably on a discharge conveyor which will carry the filled bags to an unloading station or tying station as may be desired. Preferably, any hopper passing to the dumping station which has not previously had a bag applied thereto will have been previously tripped or opened so as to allow the articles when dumped to pass therethrough into an appropriate receptacle for the loose articles. Finally, before again reaching the bag applying station, the hopper is closed and conditioned for the reception of a bag at the bag applying station.

In accordance with the foregoing, it is another object to provide a packaging machine including a frame about which a pair of vertically spaced continuous chains are driven, with the hopper assemblies as aforementioned supported upon and carried by the chains in a continuous path while the vertical weight of the hopper assemblies is carried upon a load supporting rail extending parallel to and coextensive with the traveling chains.

The foregoing as well as other objects which will be hereinafter described or will be apparent to those skilled in the art generally indicate the novel aspects of the invention and the novel features thereof will be defined in the appended claims.

Referring to the drawings.

Like reference characters in the several figures of the drawings and in the following description designate corresponding parts.

Referring especially to FIGS. 1–4 and 10, it will be noted that the illustrative machine comprises a supporting base framework structure generally designated F mounted upon castors 1 so that the machine may be readily moved from one position to another. The frame F includes a pair of upstanding main standards 2, 2 projecting upwardly from a pair of transversely extended parallel base supports 2a, 2a at the ends of which the castors 1 are mounted. The standards 2, 2 support a pair of vertically spaced elongated and parallel top and bottom plates 3 and 4, respectively, of a box frame F' which extends lengthwise of the machine.

Figure 1:
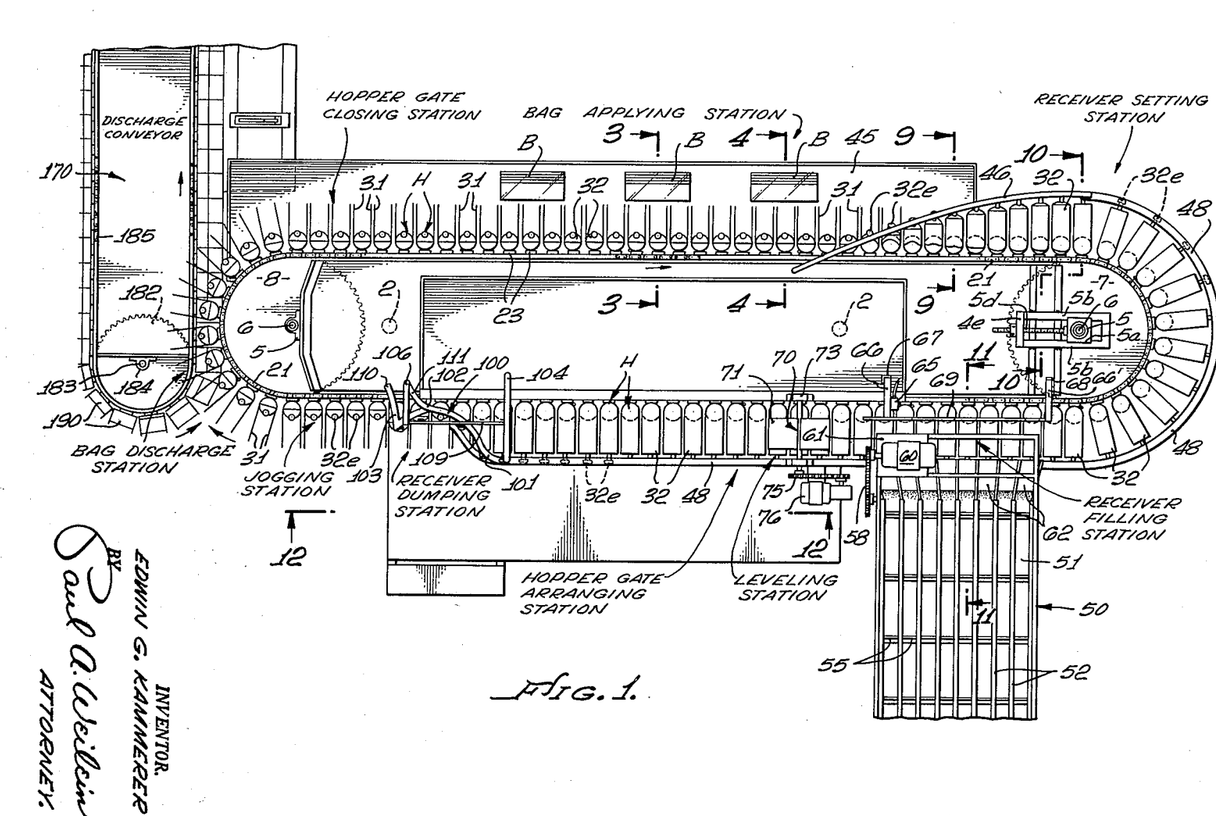
FIG. 1 is a top plan view of a machine made in accordance with the invention.
Figures 9, 10:
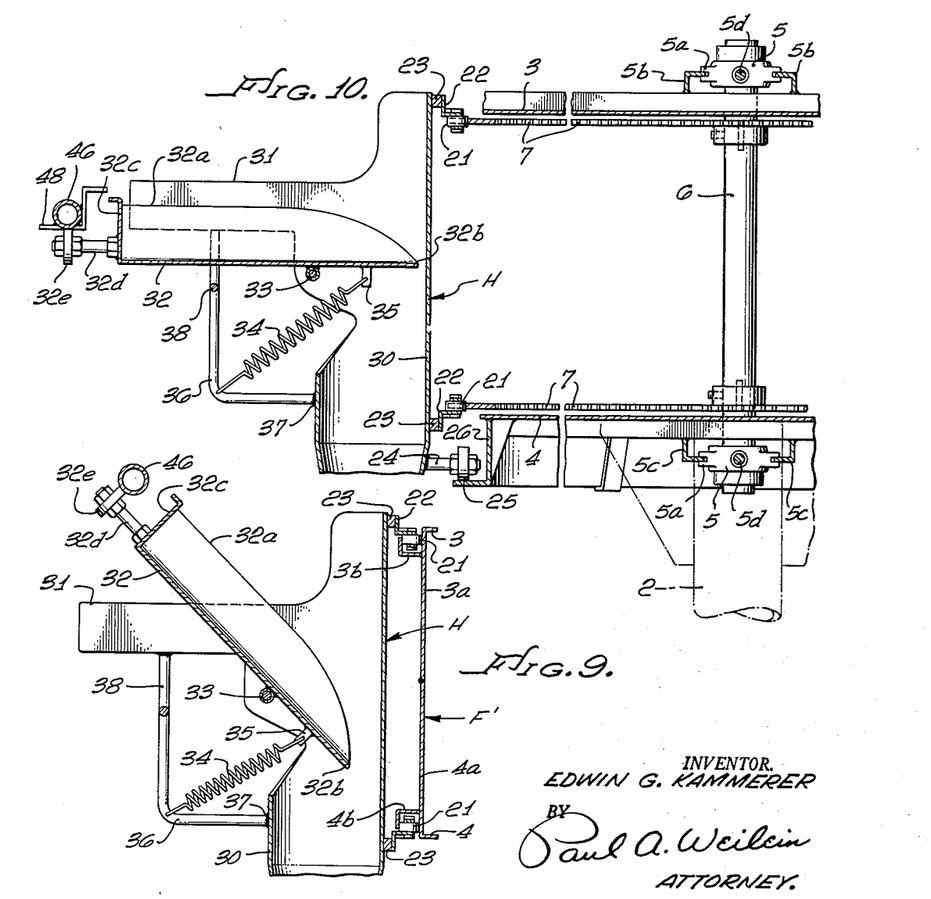
FIG. 9 is a fragmentary vertical sectional view showing the hopper receivers being pivoted from an upright position as shown in FIGS. 3, 4 and 5 as the hopper approaches the receiver setting station, this view being taken on the line 9—9 of FIG. 1.
FIG. 10 is a view corresponding to FIG. 9 showing the hopper receiver in a fully horizontal article receiving position at the receiver setting station, this view being taken on the line 10—10 of FIG. 1.

At opposite ends of the plates 3 and 4 are bearing blocks 5 in which are rotatably journalled shafts 6 carrying sprockets 7 and 8, there being a pair of sprockets 7 disposed in vertically spaced relation, as shown in FIG. 10, and corresponding pair of sprockets 8 at the opposite end of the plates 3 and 4 from the sprockets 7. Bearing blocks 5 for the shaft 6 of sprockets 7, as best seen in FIGS. 1 and 10, are carried by a pair of slides 5a, 5a mounted for movement between pairs of parallel opposed angle irons 5b, 5c, which are welded or otherwise mounted on top and bottom plates 3, 4 of the framework. An adjustor screw 5d is wedged with each of these slides 5a and is threaded in a cross-head 4e which spans the respective angle irons 5b and 5c, so as to vary the spacing of sprockets 7 and 8.

Figure 2:
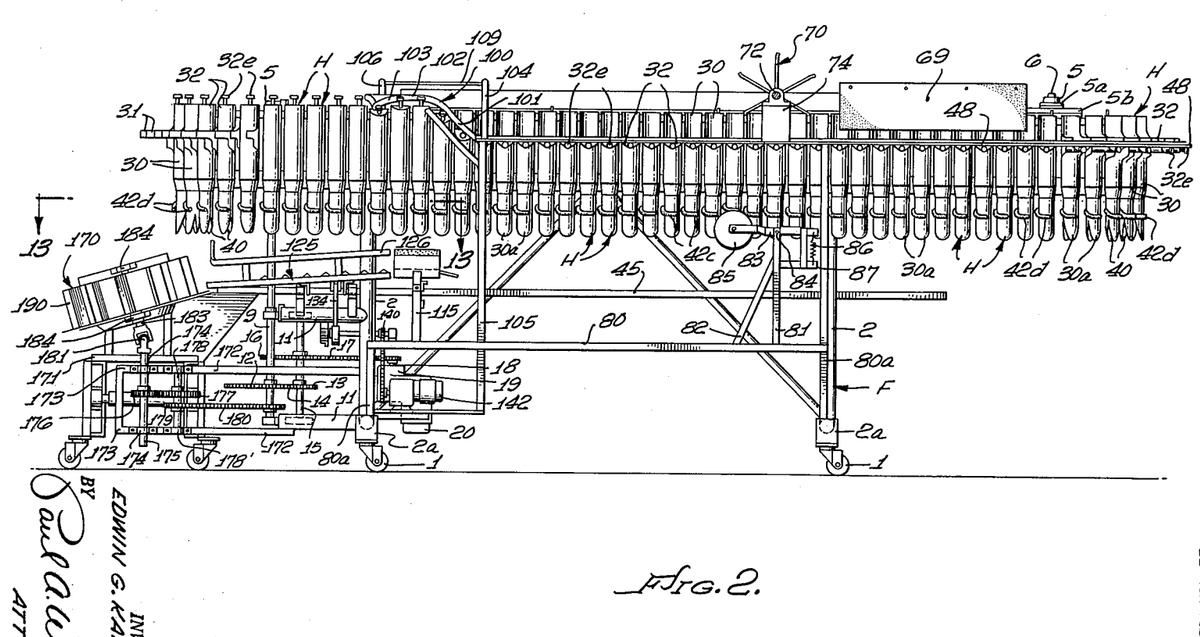
FIG. 2 is a side elevational view of the machine of FIG. 1.

The sprockets 8 are driven by an extension 9 of sprocket shaft 6, as viewed in FIG. 2. This shaft 9 is driven by a sprocket 12 thereon interconnected with a sprocket 13 by a drive chain 14, the sprocket 13 being supported on a shaft 15 extending vertically and having thereon a large sprocket 16 driven through a drive chain 17 which is connected to the output shaft 18 of a gear box 19 which is powered by an appropriate source of power such as a motor 20.

Disposed about the sprockets 7 and 8 are a pair of vertically spaced roller chains 21 which, responsive to rotation of sprockets 8, travel in an endless path about sprockets 7 and 8 and constitute endless hopper unit carrier means as will hereinafter appear. The upper and lower plates are provided with downwardly and upwardly extended flanges 3a and 4a, respectively, to which are welded or otherwise suitably connected angle irons 3b and 4b which respectively provide channels in which the roller chains travel, with the rollers projecting from the chain links and disposed in the channels in rolling contact with the opposed walls thereof so as to afford a minimum of frictional resistance to travel of the chains.

Figures 3, 4:
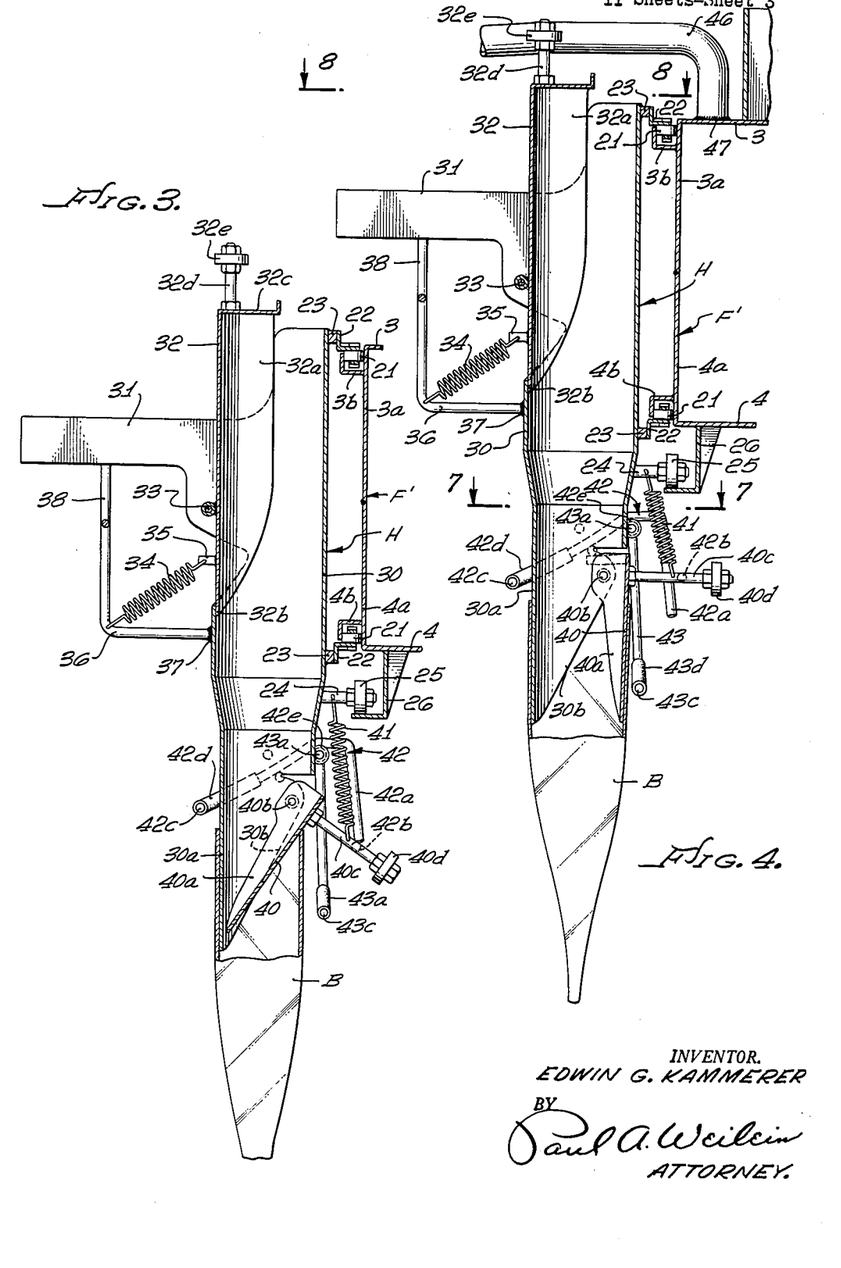
FIG. 3 is a detail view in vertical section and on an enlarged scale as taken on the line 3—3 of FIG. 1, particularly illustrating a hopper assembly in condition for receiving a bag at the bag applying station.
FIG. 4 is a view in vertical section and on an enlarged scale as taken on the line 4—4 of FIG. 1 showing the hopper assembly with a bag applied thereto.
Figure 5:
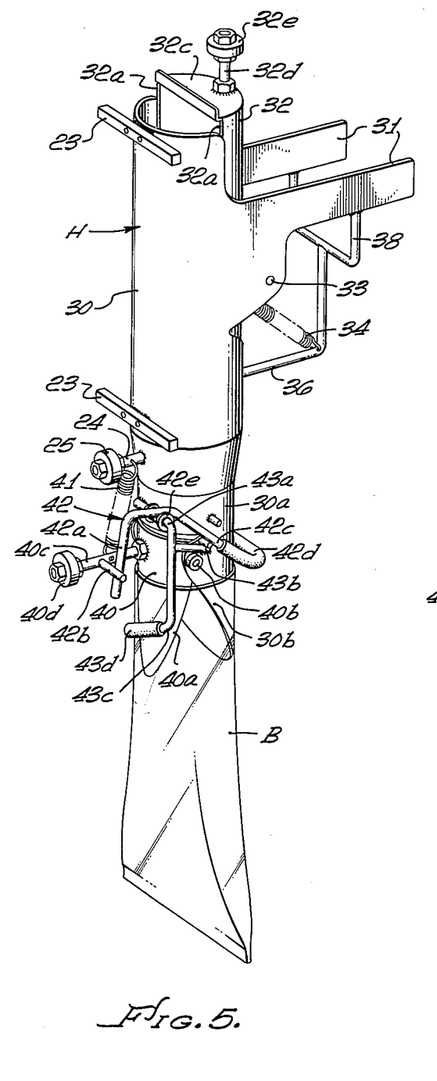
FIG. 5 is a view in perspective of the hopper assembly with a bag applied thereto.

Referring particularly to FIGS. 3 and 4, it will be noted that each of the chains 21 carries a bracket 22 to which is attached in an appropriate manner a connector bar 23. These connector bars 23 are welded or otherwise suitably connected to a hopper assembly generally designated H. A suitable number of such hopper assemblies or units H are spaced along the chains 21 in side-by-side vertically extended relation so as to travel therewith about the sprockets 7 and 8, these hopper assemblies being maintained in an upright position by virtue of the fact that the roller chains ride in the channels formed by angle irons 3b and 4b. The vertical load of the hopper assemblies H is supported upon a pin 24 projecting from the hopper assembly H and having thereon a roller 25 riding upon an angle iron or rail 26.

Each hopper assembly H comprises a vertically extended elongated and hollow body 30 which is open top and bottom. Adjacent the upper end of the body 30 it is preferably provided with a pair of opposed outstanding wings 31 between which is a hopper receiver 32, this hopper receiver being pivotally supported as at 33 for movements between an upright dumping position as shown in FIGS. 3 and 4, for example, to a horizontal article receiving position extending normal to the axis of the hopper body 30 as shown in FIG. 10 for example. Since the hoppers are located closely adjacent one another only a single wing 31 need be provided, and the wing of adjacent hoppers will provide a pair of wings between which the receiver of one hopper is disposed.

Means are provided for normally holding the receiver 32 in the upright position, this means preferably comprising a tension spring 34 connected at one end to the receiver 32 as by an outstanding ear 35 which is welded or otherwise suitably connected to the latter and connected at its other end to a member 36 which is welded or otherwise suitably secured as at 37 to the body 30 and which projects upwardly to a point where it joins a U-shaped member 38 constituting a brace for the wings 31 in the illustrative embodiment.

The receiver 32 has side walls 32a gradually tapering toward the discharge end 32b of the receiver and which lie closely within the wings 31 when the receiver is in a horizontal position and lie closely within the walls of the body 30 when the receiver is in an upright position, with the discharge end 32b thereof engaging the inner wall of the body 30 so as to limit movement of the receiver 32 to the substantially vertical position. At its outer end the receiver 32 is provided with an end wall 32c from which projects a shaft 32d. Rotatably mounted upon the shaft 32d is a roller 32e whereby the receiver 32 may be moved from an upstanding or substantially vertical position pivotally to a horizontal position as it travels along with the body 30 in a continuous path, as will be more particularly described hereinafter.

At the lower or discharge end of the body 30 it is provided with a downwardly extending portion 30a which is open at one side and has side walls 30b extending upwardly at an angle. Between these side walls 30b there is pivotally mounted a gate portion 40 of arcuate cross section having side walls 40a tapering toward the lower extremity of the gate and pivotally supported between the walls 30b on pivot pins 40b (see FIG. 7). This gate portion 40 is swingable toward and away from the downwardly extending body portion 30a on pins 40b from a hopper closing position bridging the lower end of the hopper body, as shown in FIG. 3, to an open position as shown in FIG. 4, respectively, to retain articles in the hopper body 30 and to release the same for discharge into a bag, as will presently appear.

Movement of the gate 40 to the closed or open position is under the control of an operating arm 40c outstanding from the gate 40 and having at its outer extremity a roller 40d. Suitable spring means such as a tension spring 41 connected to the arm 40c at one end and to the roller support 24 at the other end, are provided for biasing the gate 40 to the open position of FIG. 4 while the roller 40d on arm 40c, as the hopper H travels in its endless path about the machine, is effective, as will hereinafter more particularly appear, to move the gate to the closed position.

Figure 6:
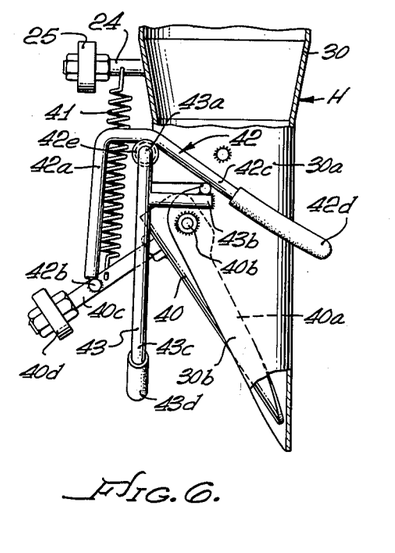
FIG. 6 is a fragmentary detail view in side elevation of the lower bag receiving end of the hopper assembly.
Figure 7:
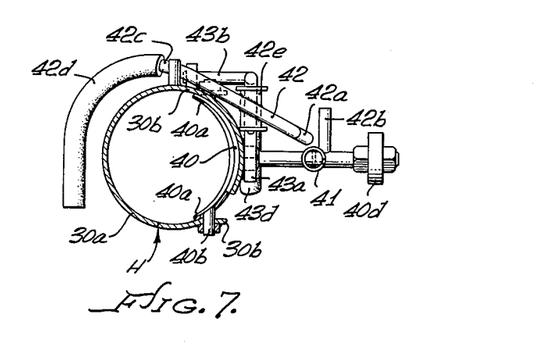
FIG. 7 is a horizontal sectional view through the hopper assembly as taken on the line 7—7 of FIG. 4.
Figure 8:
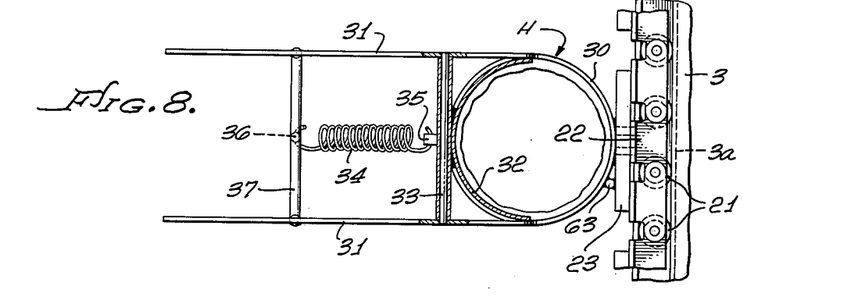
FIG. 8 is a horizontal sectional view as taken on the line 8—8 of FIG. 4.

Means are provided for releasably retaining the gate in the closed position, and in the illustrative embodiment such means comprises a releasable latch mechanism including a latch arm 42 having a downwardly extended portion 42a engageable at its lower extremity with a projection or pin 42b as shown in FIGS. 3 and 6, for example, so as to releasably retain the gate 40 in the closed position. This latch arm 42 is preferably welded, as best seen in FIG. 7, on a bearing 42 which is pivotally supported on a horizontal section 43a of a U-shaped member 43, the horizontal arm 43a of which is welded or otherwise suitably secured to the body 30. The member 43a also has an arm 43b welded thereto and welded to the body section 30a so as to rigidly support the member 43 in place. At its lower extremity the U-shaped member 43 has an arm 43c on which is disposed a resilient rubber or other sleeve 43d. This arm 43c acts as a stop or abutment to limit pivotal movement of the gate 40 toward the open position as shown in FIG. 4, for example. However, so long as the arm 42a of latch member 42 is engaged with pin 42b on gate actuating arm 43, the gate 40 remains in a closed position as shown in FIG. 3.

In order to shift the latch member 42 to release the gate 40 for movement to the open position of FIG. 4, the member 42 includes an arcuate arm 42c preferably covered with a rubber sleeve 42d, this arm 42c extends about the body 30 to the opposite side of the body from the latching arm 42a, and upon slight upward rocking movement of the arm 42c the latch arm 42a will be displaced from pin 42b so that the tension of spring 41 will move the gate 40 outwardly toward the resilient sleeve 43d on stop arm 43c. The overhanging weight of arm 42c normally maintains latch arm 42 in position for engagement with projection or pin 42 on gate operating arm 40c.

Accordingly, it will be apparent that when a bag B, as shown in FIG. 3 for example, is disposed about the lower extremity 30a of the hopper body 30 with the gate 40 in the closed position, and when the latch arm 42c is moved upwardly to release latch arm 42a from engagement with pin 42b, the gate 40 will swing to the open position of FIG. 4, thus tensioning the bag about the lower extremity of the hopper to firmly grip and support the same. The bag is thus effectively held in position at the lower extremity of the hopper assembly H, as the hopper moves through succeeding stations about the machine.

As previously stated, the apparatus embodies a suitable number of hopper assemblies H disposed in side-by-side relation and supported upon traveling chains 21 in an upright position with the load supported on rollers 25 traveling on continuous rail 26.

The bag applying station of the apparatus as shown in FIG. 1 includes a table or platform 45 whereon stacks of bags B may be arranged to facilitate their manual application to the lower extremity of the hopper assemblies as they travel past the bag applying station. Assuming for the moment that the hoppers H are in the gate closed condition of FIG. 3 as they pass the bag applying station, it will be recognized that operators located at the bag applying station can quickly remove bags B from the table or platform 45 and place them over the lower extremities of the hopper assemblies H and in so doing manually trip latch 42 so as to release the gate 40 for movement toward the resilient sleeve 43d on stop arm 43c, as shown in FIG. 4. Thus, bags may be effectively manually applied to the respective hopper assemblies H passing the bag applying station, although it will be recognized that mechanized means may be availed of if desired for placing the bags on the hoppers.

Assuming the sprockets 7 and 8 previously described to be rotating in a clockwise direction and the hoppers H to be traveling from the bag applying station toward the receiver setting station, it will be noted that there is disposed in the path of the hopper assemblies as seen in FIGS. 1, 9 and 10, a cam rail or track 46 which is connected to the body plate 3 as at 47 and projects progressively further outwardly therefrom as it extends longitudinally of the apparatus. The rail 46 is disposed so as to intercept receiver rollers 32e and gradually declines so that as the hopper assemblies travel to the right as viewed in FIG. 1, the receivers 32 are progressively moved or tilted from an upright position as shown in FIG. 4 through the angular dispositon shown in FIG. 9 to the substantially horizontal position of FIG. 10. At the point where the cam track or rail 46 is at its lowest elevation as shown in FIG. 10 whereat the receiver 32 will be in the horizontal position, the cam rail 46 joins with a horizontally extended rail 48 which extends circumferentially about the extremity of the apparatus in parallel relation to the chain and thence longitudinally along the opposite side of the apparatus from the bag applying station so that the receivers 32 are set in the horizontal position at the receiver setting station by the cam rail 46 and are then held in such a position by the rail 48 as the hoppers progress through their continuous path in the apparatus. With the receivers 32 thus set the hopper assemblies H traverse the right-hand end of the machine as shown in FIG. 1 and progressively arrive at the receiver filling station.

At the receiver filling station is a feed conveyor 50 including an endless belt 51 which is preferably divided longitudinally by a plurality of laterally spaced dividers 52 carried by an appropriate framework generally designated 53 supported on a base support 54. In addition, the belt 51 is divided into longitudinally spaced compartments by dividers 55 so that the feed conveyor is effectively compartmentized to receive articles such as carrots designated C or the like in relatively uniform quantities or volumes. The belt 51 extends about rollers in a conventional manner, one such roller being shown at 56 and being driven, by a sprocket 57 engaged by a drive chain 58. This chain 58 is driven by a drive sprocket 59 of a motor 60 connected with a suitable source of current and supported upon a base 61 in a convenient fashion. Carrots C or other articles are discharged from each compartment of the conveyor 50 into a chute 62 which discharges into the horizontally disposed receivers 32 as they pass the receiver filling station. These carrots or other articles will be discharged from the chute 62 into the receivers 32 between the wings 31 on the hopper body 30 which provide effective baffles between the respective hoppers to guide the articles C into the receivers.

Figure 11:
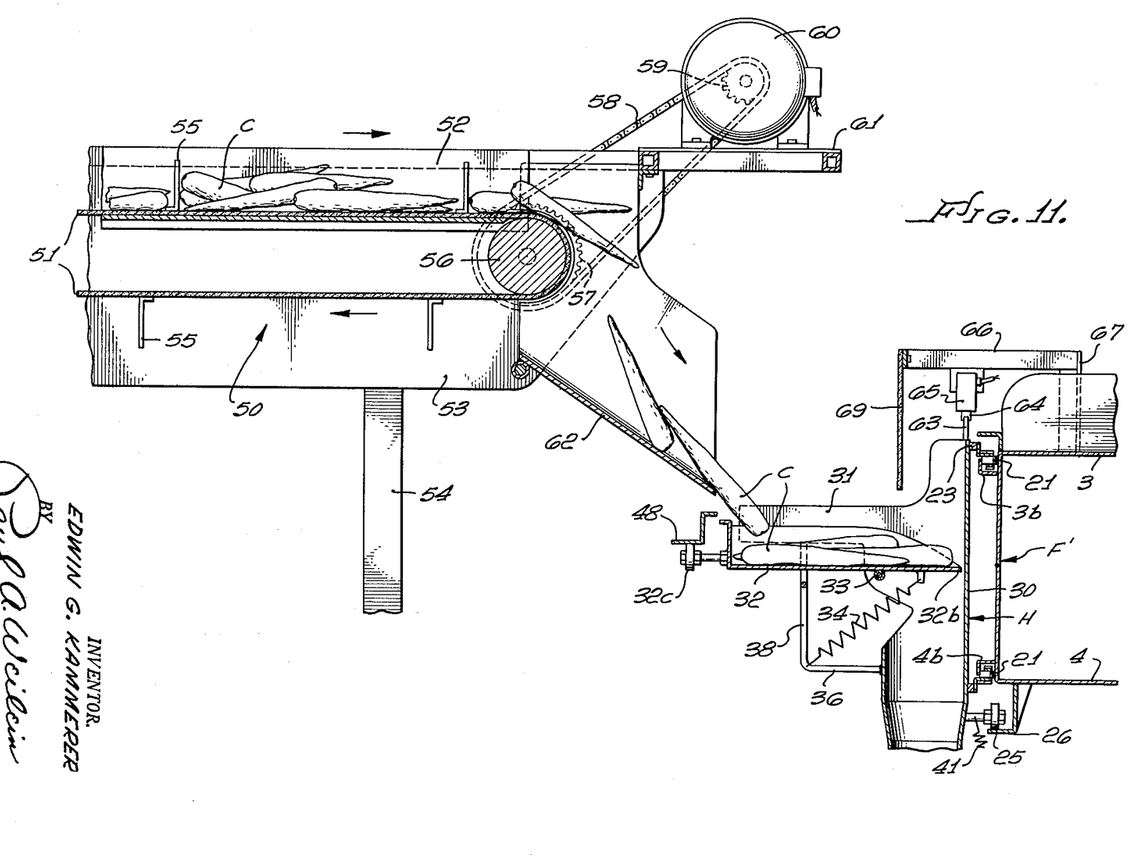
FIG. 11 is a vertical sectional view as taken on the line 11—11 of FIG. 1 at the receiver filling station.

It will be noted in FIG. 1 that the feed conveyor is divided into eight runs by the partitions 52. Therefore, if desired, the hoppers H may be provided with an upstanding pin 63 as seen in FIG. 11 on each eighth hopper, which pin will engage a switch arm 64 of a microswitch 65 (see FIG. 11) which is adapted to effect intermittent energization of the feed conveyor drive motor 60 so that one transverse row of feed conveyor compartments will be dumped as each eight hoppers pass the receiver filling station. The microswitch 65 is preferably supported upon a horizontally extended arm 66 projecting into overlying relation to the path of travel of the hoppers H from an upstanding support arm 67 welded or otherwise suitably secured to the plate 3 of the frame assembly.

In spaced relation to the support arm 66 is a second arm 66' also projecting into overlying relation to the path of travel of the hoppers H and supported upon a support arm 68 which like arm 67 is preferably welded to the frame plate 3. These support arms 66 and 66' support a downwardly extended apron 69 which extends longitudinally and substantially spans the chute 62 so as to function as a buffer strip against the bouncing of carrots or other articles C from the receivers 32 as they are discharged from the chute 62.

Figure 14:
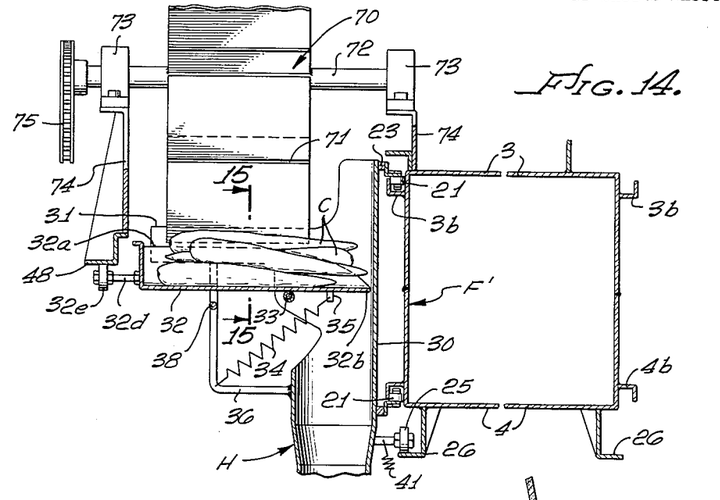
FIG. 14 is a vertical sectional view as taken on the line 14—14 of FIG. 12 at the article levelling station.
Figure 15:
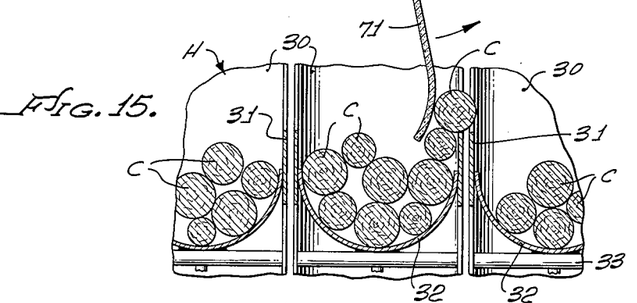
FIG. 15 is a view in section as taken on the line 15—15 of FIG. 14.

As the hoppers H leave the receiver filling station it is preferred that means be provided to level off or arrange the carrots C or other articles in the respective receivers 32. Accordingly, the apparatus is provided with a levelling station as more particularly shown in FIGS. 1, 14 and 15. At this station a rotary beater generally designated 70 is provided, this beater preferably comprising a member having a plurality of radiating resilient brush-like arms or blades 71 which will engage the carrots in the receivers 32 as shown in FIGS. 14 and 15 and displace excess articles into adjacent receivers and/or otherwise level off and arrange the articles in the receivers. The beater is supported upon a rotary shaft 72 journalled in bearings 73, 73 respectively supported on brackets 74, 74 welded or otherwise appropriately mounted on the frame at opposite sides of the path of the hoppers beneath the beater 70. This shaft 72 is preferably driven by a chain 75 powered by a motor 76 appropriately supported upon the frame.

Figure 12:
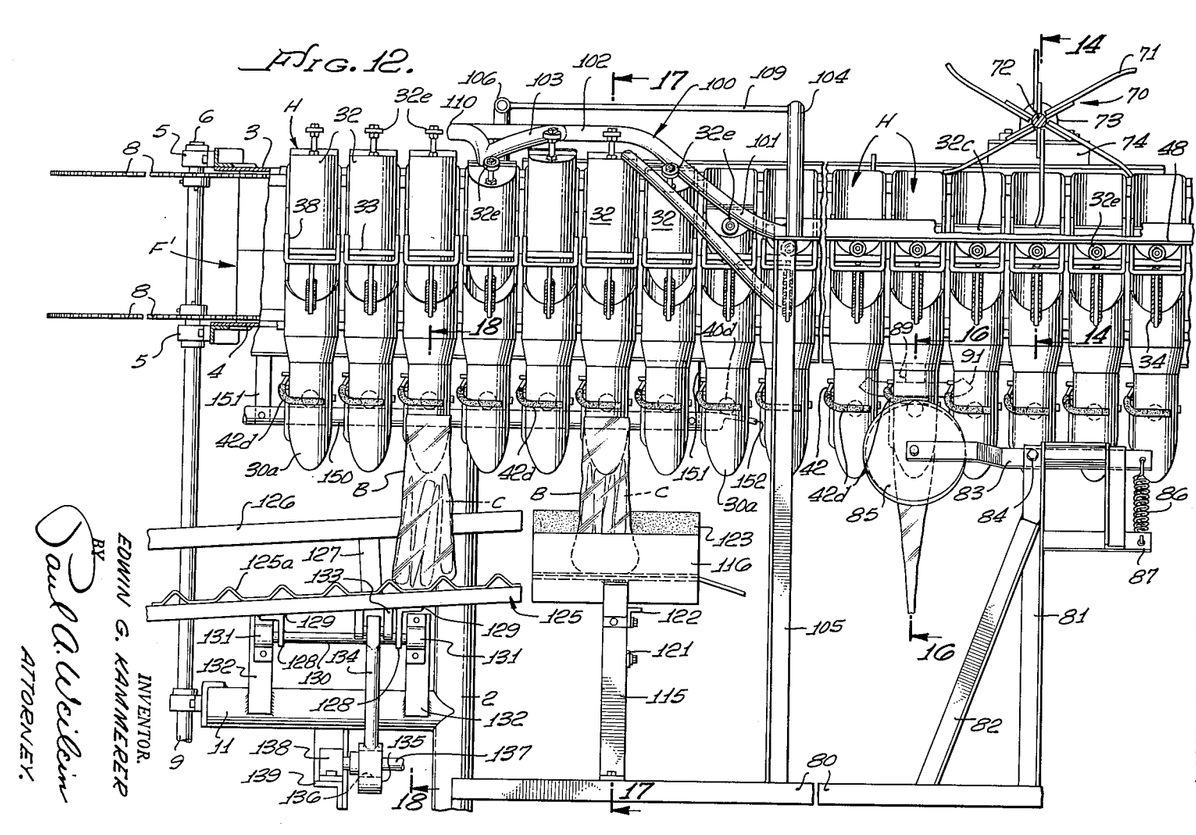
FIG. 12 is a fragmentary side elevational view on an enlarged scale as viewed in the zone embraced by the line 12—12 of FIG. 1 and showing the levelling station, the hopper tripping station and the receiver dumping station, the article arranging station being broken away.
Figure 16:
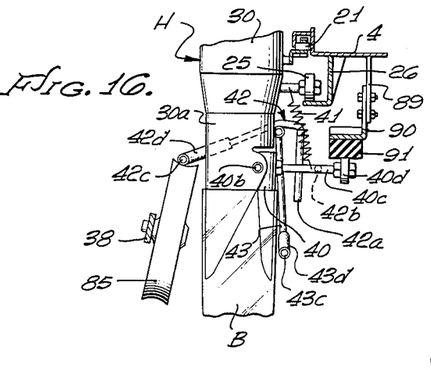
FIG. 16 is a fragmentary detail view in vertical section as taken on the line 16—16 of FIG. 12 at the hopper tripping station.

After passing the levelling station the successive hopper assemblies H arrive at a hopper gate tripping station which is best illustrated in FIGS. 2, 12 and 16. Referring particularly to FIG. 12, there is shown a platform 80 which has a purpose to be hereinafter more particularly described. Adjacent the right hand end of the platform 80 is an upstanding angle iron or other support 81 preferably reinforced by a strut 82. At the upper end of the support 81 is a pivotally mounted lever 83 connected by a screw 84 between its ends to the support 81 and having a roller 85 rotatably mounted at one end. At its other end the lever 83 is connected by coiled tension spring 86 to a spring anchor arm 87 projecting from the support 81. The roller 85 is accordingly resiliently biased into a position disposed in the path of latch tripping arms 42c of latch elements 42. As previously described, when a bag B is applied to the lower end of the hopper assemblies, the latch 42 is manually or otherwise tripped so as to disengage latch arm 42a thereof from pin 42b on roller support 40c. However, in the event that no bag has been applied to a given hopper assembly H, then as such unbagged hopper assembly passes the hopper gate tripping station, its latch tripping arm 42c will be engaged by the roller 85 to pivot the latch member 42 in a clockwise direction, thus releasing the gate 40 so that the spring 41 will swing the gate to the open position.

Preferably, means are provided to cushion opening movement of the gate 40 at the gate tripping station and in this connection, a bracket 89 depends from lower frame plate 4 and has connected at its lower extremity a shoe 90 having thereon a resilient cushion pad 91 engageable by the rollers 40d carried on the support 40c of each gate 40 so as to resiliently cushion opening movement of any gate tripped at the gate tripping station. While the gate tripping station has been herein illustrated as being located in the path of travel of the successive hoppers at a point subsequent to the filling of the hopper receivers 32, it will be appreciated that the hopper gate tripping station may be located anywhere in the apparatus subsequent to the bag applying station and prior to the receiver dumping station which will hereinafter be described.

As the hoppers H pass from the hopper gate tripping station to the just-mentioned receiver dumping station, there is preferably an elongated section where the loaded hopper receivers 32 pass by a portion of the afore-mentioned platform 80 upon which operators may stand to visually inspect the loaded hopper receivers 32 and effect any equalization of the distribution of the carrots or articles C as may be indicated. This platform 80, as seen in FIG. 2, is supported at its opposite ends on upright supporting members 80a which are welded or otherwise appropriately connected to the transversely extended base members 2a. In addition, the platform 80 is preferably rigidly connected to the frame supports 2.

As the hoppers H leave the arranging station they arrive at a receiver dumping station which is best illustrated in FIGS. 1, 2, 12 and 17. Throughout passage of the hoppers H from the receiver setting station through the receiver filling station, the levelling station, the hopper gate tripping station, and the arranging station, the rollers 32e at the ends of roller supports 32d of receivers 32 have been riding beneath rail or track 48 so that the hopper receivers 32 have been maintained in substantially horizontal position. At the end of the arranging station the rail 48 merges with a cam rail generally denoted at 100 having a section 101 extending upwardly and laterally inwardly with respect to the apparatus whereby the rollers 32e being held against the cam track section 101 by the action of springs 34 will allow the receivers 32 to progressively pivot from the horizontal position to a substantially vertical position. The cam track 100 has a section 102 leading longitudinally of the machine for a short distance and joining a section 103 having a sharply angulated outwardly extending and slightly downwardly declining form so as to impart to the receivers 32 as they pass thereover a quick sharp jogging action so as to assure dumping of any carrots or other articles C therefrom through the hoppers H into the bags B thereon.

The cam track 100 is supported by a member 104 connected to the upper frame plate 3 and extending above the path of the hopper assemblies in overlying relation thereto and then extending downwardly for connection to the rail 48 and the cam track 100 substantially at their juncture. In addition, an upright support 105 projects from the platform 80 and is connected to the rail 48 substantially at the juncture thereof with the cam track 100. There is also, in spaced relation to the support 104, a second supporting member 106 (see FIG. 17) which is supported upon the upper frame plate 3 and has the cam track 100 welded thereto as at 107. Preferably, a guard rail 109 extends between the two supporting members 104 and 106 and in overlying relation to the major portion of the cam track 100 so as to partially conceal the same. The jogging cam track section 103, it will be observed, is preferably made of a separate section joined to the main cam track section 102 and terminating in a free extremity 110 while a section 111 of the cam track 100 diverging relative to the jogging section 103 is welded to the support 106 as previously referred to.

At this receiver dumping station means are preferably provided for affording an auxiliary support for the bags B as the carrots C or other articles are being discharged from the hoppers H into the bags. In this connection, it will be noted that an upright support 115 is connected to the platform 80 beneath the zone of cam track 100 at which the receivers 32 are initially shifted to a full vertical position so as to dump the carrots therefrom. The upper end of the support 115 has connected thereto an outwardly inclined plate 116 forming one side of a bag saddle. A plate 117 diverging upwardly relative to the plate 116 forms the other side of the saddle and is connected to a horizontally extended saddle base plate 118 which is in turn supported upon a vertically adjustable member 119. This member 119 is slotted as at 120 for adjustable connection to an outstanding support arm 121 carried by the support 115 and to a cross member 122 connected to the support 115 and extending transversely of the apparatus. Preferably the saddle defined by plates 116, 117 and 118 is lined with a suitable cushion 123 and as the bags B progressively pass through the saddle and receive carrots dumped therein from the receivers 32, the sudden loading of the bags is prevented from causing displacement of the bags from the lower ends of the hopper assemblies.

From the receiver dumping station the hoppers with filled bags thereon pass to a jogging station which is best illustrated in FIGS. 2, 12, 13 and 18. At this jogging station is a declining shaker table 125 which constitutes a bag support and is preferably provided with an undulating face plate 125a extending longitudinally therealong. In addition, the shaker table 125 is preferably provided with an inside guard rail 126 supported on the table by a supporting member or strut 127. The shaker table 125 is supported upon a pair of angle irons 128 or other appropriate structural elements which are welded or otherwise connected as at 129 to the table 125 and are connected at their other ends to a shaft 130 pivotally journalled in bearing blocks 131 which are respectively supported on upright members 132 welded or otherwise suitably secured to main frame member 11 previously described. Beneath the table is a pair of ears 133 between which extends a rod 134 connected to means for effecting reciprocation of the rod and consequent vibratory pivotal movement of the table 125 about the axis of shaft 130.

In the illustrative embodiment the rod 134 is connected to a collar 135 within which is rotatably disposed an eccentric 136 driven by shaft 137. This shaft 137 is journalled in bearing blocks 138 carried upon a pair of transverse frame members 139. The shaft 137 is driven by a chain 140 which is in turn connected to an output shaft 141 of a drive motor 142 whereby the vibratory shaker table 125 will be caused to continuously vibrate as the loaded bags depending from the respective hoppers pass to the bag discharge station which will be hereinafter described.

Figure 13:
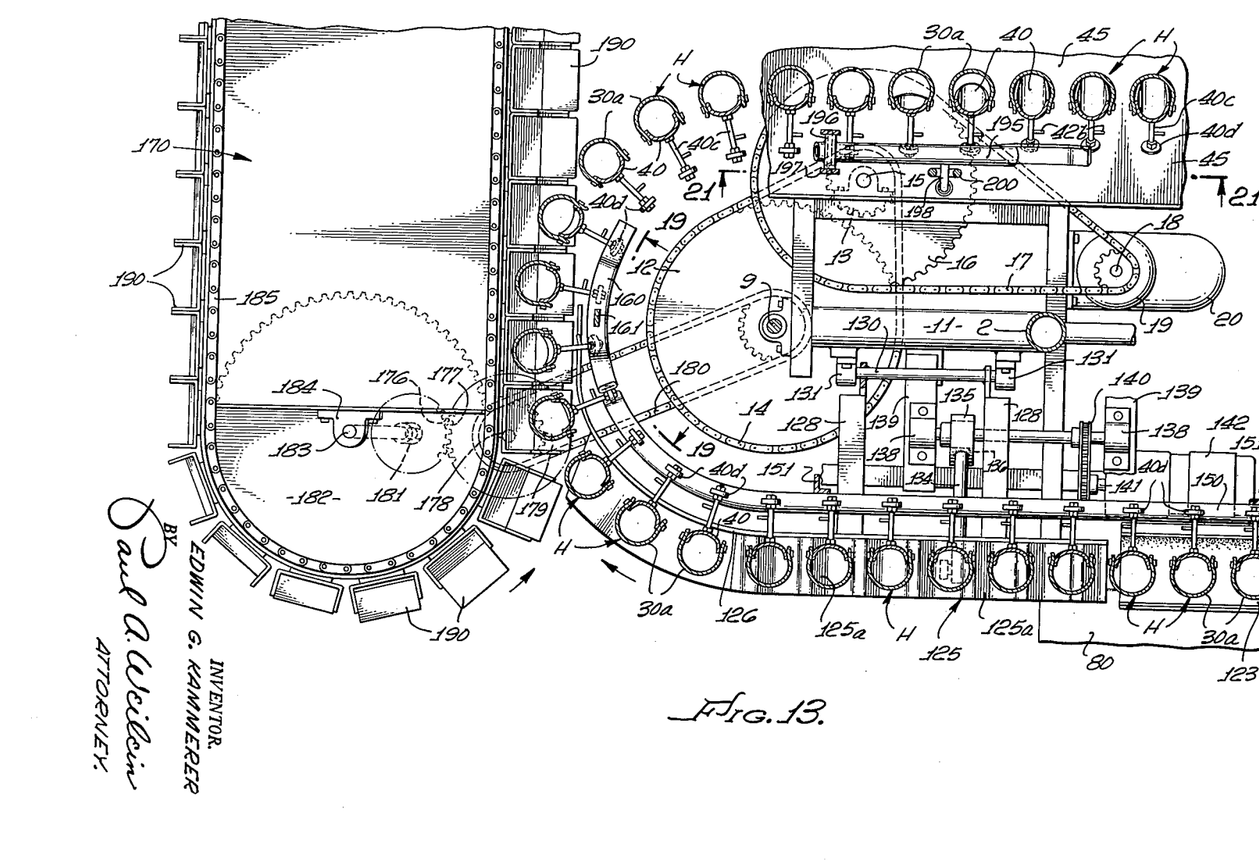
FIG. 13 is a horizontal sectional view on an enlarged scale as taken on the line 13—13 of FIG. 2.
Figures 17, 18:
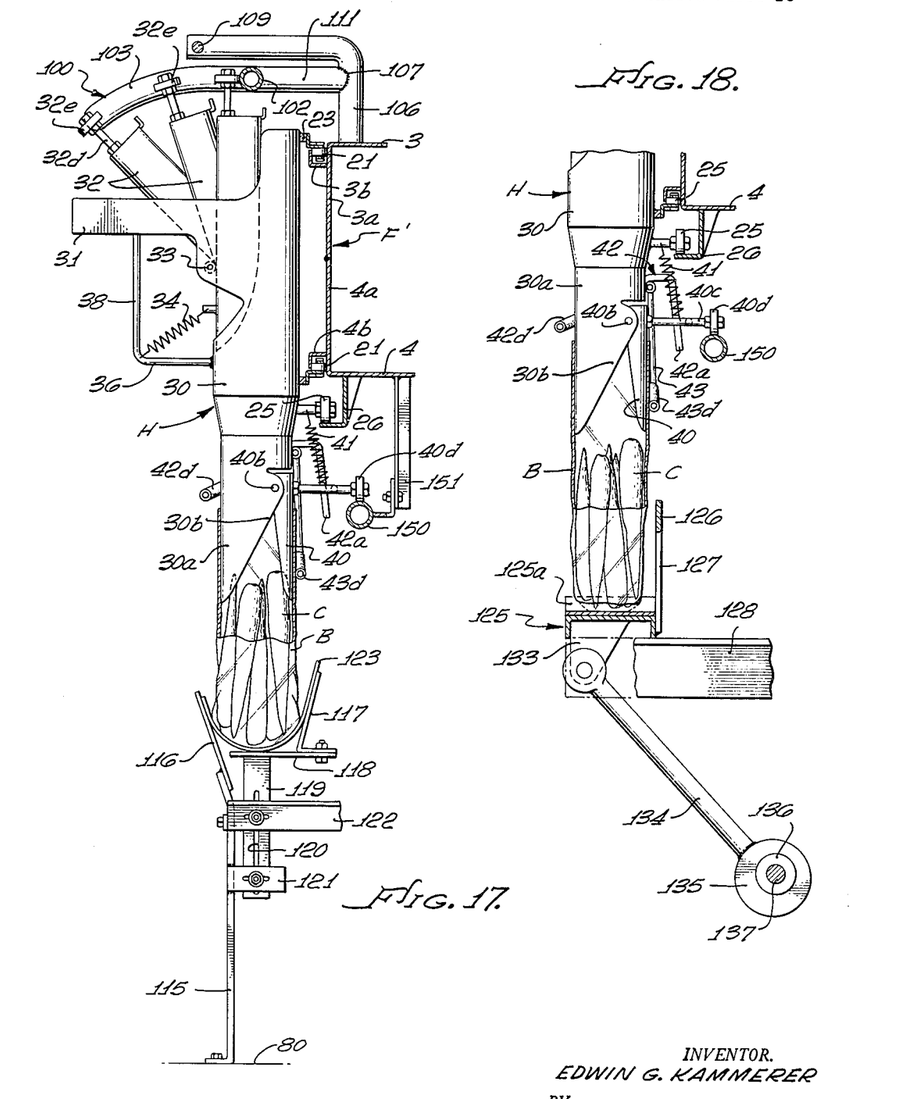
FIG. 17 is a vertical sectional view as taken on the line 17—17 of FIG. 12 at the receiver dumping station.
FIG. 18 is a view in vertical section as taken on the line 18—18 of FIG. 12 at the jogging station.

As the bags are being loaded with carrots C or other articles to be bagged and as the bags are passing through the jogging station, means are preferably provided to assure retention of the bags on the bottom of the respective hoppers H. To this end, as best seen in FIGS. 12, 13 and 17, a roller track 150 is suspended from the lower frame plate 4 as by a suitable number of supporting brackets 151 spaced along the rail 150, this rail lying in the path of the rollers 40d on gate operator arms 40c. At is lead end, the track 150 is provided with a ramp 152 which initially engages the rollers 40d urging them slightly upwardly and effecting pivotal movement of the successive gates 40 into tight pressure contact with the resilient sleeves 43d so as to further stretch the bags and tightly clamp the upper end of the bag therebetween. Accordingly, as the successive bags B are subjected to the shock of carrots C or other articles falling therein and as they travel down the declining vibratory table 125, they are precluded from being inadvertently displaced from the lower ends of the hopper assemblies H en route to the bag discharge station which will now be described.

Figures 19, 20:
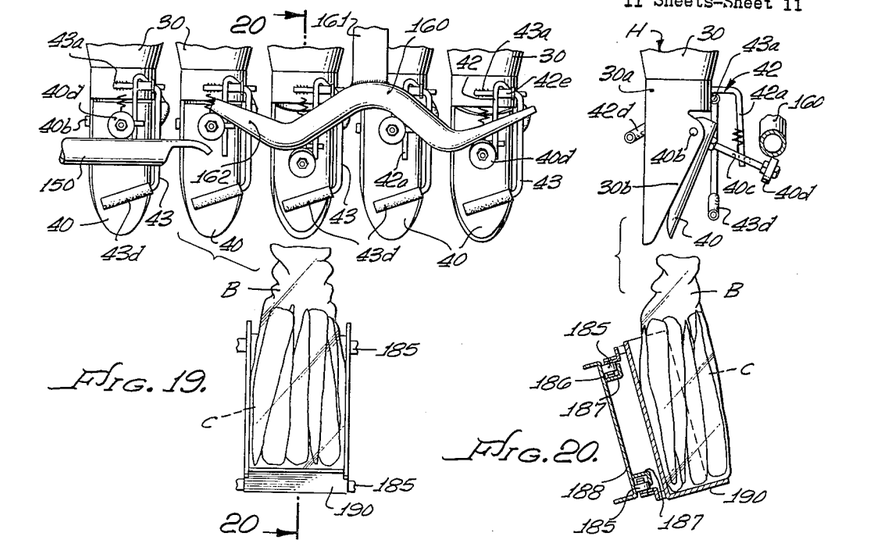
FIG. 19 is a fragmentary view in elevation of the zone designated by the line 19—19 of FIG. 13 at the bag discharge station.
FIG. 20 is a vertical sectional view as taken on the line 20—20 of FIG. 19.

This bag discharge station is best illustrated in FIGS. 1, 13, 19 and 20. With particular reference to FIGS. 13 and 19, it will be noted that the rail 150 just described which holds the gate 40 in tight engagement with the resilient sleeves 43d on members 43, extends about the end of the machine arcuately to a point adjacent an undulated cam track 160 supported as by a hanger 161 from an appropriate portion of the base frame of the apparatus such as the lower frame plate 4. Accordingly, the rollers 40d on arms 40c of gates 40 as the respective hopper assemblies travel about the end of the machine as viewed in FIG. 13 leave the cam rail 150, they come into engagement with a downwardly extended section 162 of the cam rail 160 which pivots the gates 40 away from the resilient sleeves 43d as each successive hopper H passes from the cam rail 150 as shown in FIG. 20. Such pivotal movement of the gate 40 of each hopper will release the respective bag B loaded with carrots C or other articles therefrom and allow the same to drop from the lower end of the hopper assembly onto a discharge conveyor generally designated 170. As the rollers 40d pass along the undulated track 160 the gates 40 are pivoted rapidly so as to effectively assure that the bags will be discharged therefrom and so as to assure that any bag tending to hang up on the lower end of any hopper will be dropped to the discharge conveyor 170.

This discharge conveyor 170 may be of any desired form, but preferably, as shown in FIGS. 1, 2 and 13, more particularly, comprises a framework generally designated 171 connected to the main frame F of the apparatus thus far described as by a plurality of connecting members 172. The discharge conveyor frame includes a pair of horizontally extended frame members 173 carrying bearing blocks 174, 174 in which is journalled a drive shaft 175 driven by motor 20 which drives the chains 21 as previously described.

On the shaft 175 is a gear 176 which is in mesh with a gear 177 carried on a shaft 178 mounted in bearing blocks 179 and extending parallel to shaft 175 in spaced relation thereto. Also on the shaft 178 is a chain driven sprocket 179 driven by chain 180 which is driven by shaft 9 constituting the final drive shaft to the drive sprocket 8 of the hopper carrying apparatus. Thus, shaft 175 is driven in timed relation to the hoppers H, and shaft 175 is connected by a universal joint 181 to a sprocket 182 mounted on a shaft 183 for rotation therewith. It will be noted that shaft 183 is journalled in bearings 184, 184 which are mounted on an axis inclined to the shaft 175 as best seen in FIG. 2. Extending about the sprocket 182 and about a corresponding idler sprocket (not shown) at the opposite end of the discharge conveyor is a pair of endless chains 185 similar to the chain 21 previously described and riding in channels 186 formed by angle irons 187 carried by elements 188 of the angularly disposed discharge conveyor framework. Carried by the chains 185 is a plurality of bag receiving compartments 190 which are open at one side and are adapted to receive the bags B discharged from the hoppers H as they successively pass the bag discharge station. The filled bags may be removed from the discharge conveyor compartments 190 and manually or otherwise tied as may be desired at the upper end and boxed for shipment in an appropriate manner.

Figure 21:
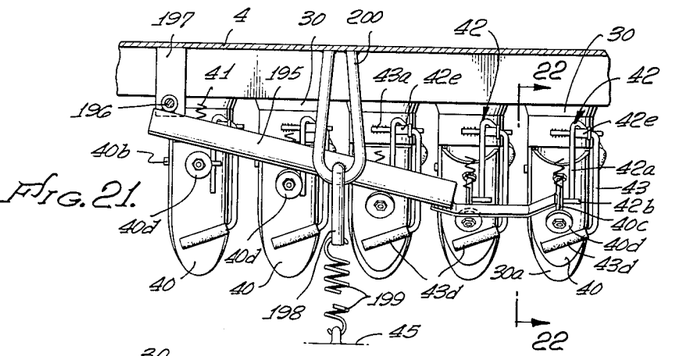
FIG. 21 is a view partly in section and partly in elevation as taken on the line 21—21 of FIG. 13 at the hopper closing station.
Figure 22:
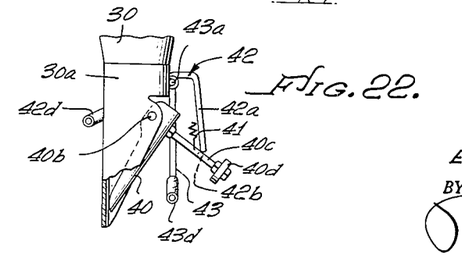
FIG. 22 is a fragmentary view in elevation with a portion of the hopper broken away on the line 22—22 of FIG. 21.

After the filled bags have been discharged the hoppers H proceed in their endless path about the apparatus to a hopper gate closing section which is best illustrated in FIGS. 1, 13 and 21. At this gate closing section is an inclined cam rail 195 which is pivotally supported as at 196 at one end on a downwardly extended pair of support members 197 welded or otherwise suitably secured to the lower frame plate 4. Means are provided for yieldably holding the rail 195 in the angularly disposed position best shown in FIG. 21 and in this connection there is welded or otherwise suitably secured to the rail 195 a downwardly extending connector 198 to which is attached one end of a tension spring 199, the other end of the tension spring being connected to an appropriate part such as the platform 45 previously described. The member 198 extends through a loop 200 which also depends from the bottom frame plate 4 so as to limit downward pivotal movement of the rail 195 upon engagement of the member 198 with the base of the loop 200 so that the rail is normally resiliently restrained to the position shown in FIG. 21. As the hoppers 40 pass the rail 195 the rollers 40d carried by the arms 40c of gates 40 successively engage the rail 195 and are urged downwardly thereby against the tension of gate opening springs 41. The holding force of spring 199 is greater than the holding force of gate opening springs 41 so that the gates are progressively caused to pivot toward the lower section 30a of the hopper bodies 30 until the latching arms 42a of latch members 42 are engaged with the pins 42b carried on roller supports 40c so as to again close the respective gates 40, as shown in FIG. 22, so that the gates 40 are again closed as the hopper approaches the bag applying station and the operative cycle is completed.

From the foregoing it will now be apparent that in the use of the apparatus described above, bags are applied manually to the lower ends of the hopper assemblies H with the simultaneous release of the latch member 42 so that the gates 40 are urged to an open position, so that the bags will be tensioned about the downwardly extended body portion 30a and the relatively movable bag gripping portion or gate 40 of each hopper.

As the hoppers H with bags applied thereto then travel in a right-hand direction as viewed in FIG. 1, the receiver operating rollers 32e sequentially and progressively effect pivotal movement of the receivers 32 from a vertical or upright dumping position to a horizontal article receiving position as the hoppers pass around the right-hand end of the machine and progress towards the receiver filling station.

At the receiver filling station the feed conveyor 50 under the control of microswitch 65 is operated to fill the hopper receivers with carrots or other articles to be bagged. While carrots are herein illustrated as the articles to be bagged, it will be appreciated that various forms and types of articles may be placed in the bags or other receptacles and granular material may also be effectively handled. While means have been shown for effecting intermittent feed of the feed conveyor 50, it will be readily appreciated that the feed of the conveyor 50 may be continuous and in timed relation to the passage of hoppers H therepast so as to effectively and uniformly fill the hopper receivers 32 with articles to be bagged.

As the filled receivers leave the filling station, articles therein are levelled and arranged by the beater 70 at the levelling station so that a substantially uniform volume of articles will be in the containers and the articles will not be allowed to remain in the receivers in an unorderly fashion.

Following the levelling station, the hoppers arrive at the hopper gate tripping station whereat any hopper gates which have not been manually tripped at the bag applying station will be automatically tripped so that even though carrots or other articles are supplied to the receivers at a previous station, the articles will not remain in the hopper when they are dumped from the receiver at the receiver dumping station, but instead, will be discharged from the lower end of the hopper into an appropriate receptacle or the like for removal or replacement into the feed conveyor. Alternatively, such articles may be advantageously employed at the arranging station which is disposed between the hopper gate tripping station and the dumping station and whereat an operator may manually effect such rearrangement of articles and redistribution thereof as may be necessary to assure the uniformity of the volume or number of articles contained in each receiver as it passes the arranging station.

At the receiver dumping station the receiver is allowed to move from the horizontally disposed position pivotally to an upright position as the rollers 32e at the ends of the receivers ride up the cam track 100, thus dumping the articles contained in the receivers into the bags at the lower end of the hoppers. As the rollers 32e pass over the cam track section 103 of dumping station cam track 100, the respective receivers will be vigorously oscillated so as to assure the discharge of any articles therefrom which may be in anywise inadvertently bound or retained therein.

Since the bags are supported in the saddle comprising angularly disposed plates 116 and 117 and base plate 18, sudden loading of the bags will not force the same from the lower ends of the hopper assemblies, but in addition, cam track 150 with which gage rollers 40d are engaged will forcibly hold the gates 40 in engagement with the resilient sleeves 43d to further prevent inadvertent displacement of the bags from the lower ends of the hoppers.

As the hoppers progress the bags are vibrated at the vibratory table 125 so as to settle the articles in the bags, thus facilitating subsequent tying of the upper ends of the bags.

As the filled bags still retained at the lower ends of the hopper continue to travel along their continuous path, the bags will be successively discharged at the discharge station when the gate rollers 40d engage the bag discharge cam track 160 to shift the gates 40 toward the lower end sections 39a of hopper bodies 30, and the filled bags will drop into receptacles 190 of discharge conveyor 170 so as to be carried from the machine for tying and appropriate distribution.

From the discharge station the hoppers will progress to the gate closing section where rollers 40d will engage gate closing cam track 195 to again close the gate 40 as shown in FIG. 22 prior to the commencement of travel of the respective hoppers through the bagging station and thence cyclically through the entire operation.

From the foregoing it will be apparent that I have provided a novel and extremely simple apparatus for filling a receptacle with carrots or other articles or material in an efficient and inexpensive manner and eliminating the need for much manual labor. While the machine as herein disclosed contemplates manual labor for the purpose of applying bags to the hoppers and arranging articles at the arranging station as well as for tying the bags, it will be recognized that mechanical means may be availed of for performing these functions without departing from the spirit of the invention, and changes and alterations may be made in the mode of operation or the structure of the machine without departing from the spirit of the invention as defined in the appended claims.

I claim:

1. Apparatus for placing articles in receptacles, comprising: a plurality of hoppers each including a vertically extended hollow body; means at the lower end of said body for receiving and supporting a receptacle; a tiltable receiver at the upper end of said body movable from a horizontal article receiving position to a vertical dumping position; means for moving said hoppers in a continuous path; means disposed in the path of said hoppers for moving the receivers of successive hoppers into a horizontal position to enable loading of articles thereinto; means disposed in the path of said hoppers for positioning said receivers of successive hoppers vertically to dump said articles into a receptacle at the lower end of said hoppers; and means disposed in the path of said hoppers for successively releasing said receptacles.

2. Apparatus as defined in claim 1, wherein said means at the lower end of said body for supporting a receptacle includes a gate pivotally supported on said body; an abutment adjacent to said gate and engageable thereby; and means urging said gate toward said abutment to grip a receptacle therebetween.

3. Apparatus as defined in claim 1, wherein said means at the lower end of said body for supporting a receptacle includes a gate pivotally supported on said body; an abutment adjacent to said gate and engageable thereby; means urging said gate toward said abutment to grip a receptacle therebetween; and support means disposed in the path of said hoppers beneath the receptacles supported thereby.

4. Apparatus as defined in claim 1, wherein said means at the lower end of said body for supporting a receptacle includes a gate pivotally supported on said body; an abutment adjacent to said gate and engageable thereby; means urging said gate toward said abutment to grip a receptacle therebetween; and support means disposed in the path of said hoppers beneath the receptacles supported thereby; said support means including a saddle at the point in the path of travel of said hoppers where the receivers of said hoppers are positioned vertically.

5. Apparatus as defined in claim 1, wherein said means at the lower end of said body for supporting a receptacle includes a gate pivotally supported on said body; an abutment adjacent to said gate and engageable thereby; means urging said gate toward said abutment to grip a receptacle therebetween; and support means disposed in the path of said hoppers beneath the receptacles supported thereby; said support means including a vibratory member disposed beneath said hoppers between the position in the path of travel of said hoppers where said receivers of said hoppers are positioned vertically and the means for releasing said receptacles from said hoppers.

6. Apparatus as defined in claim 1, wherein said means at the lower end of said body for supporting a receptacle includes a gate pivotally supported on said body; an abutment adjacent to said gate and engageable thereby; and a spring urging said gate toward said abutment to grip a receptacle therebetween.

7. Apparatus as defined in claim 1, wherein said means at the lower end of said body for supporting a receptacle includes a gate pivotally supported on said body; an abutment adjacent to said gate and engageable thereby; and a cam rail disposed in the path of said gate of successive hoppers for urging said gate toward said abutment to grip a receptacle therebetween.

8. Apparatus as defined in claim 1, wherein said means at the lower end of said body for supporting a receptacle includes a gate pivotally supported on said body; an abutment adjacent to said gate and engageable thereby; means urging said gate toward said abutment to grip a receptacle therebetween; and latch means engageable with said gate to releasably hold said gate in spaced relation to said abutment.

9. Apparatus as defined in claim 8, wherein said latch means includes a member shiftably carried by said hopper body; a part on said gate engageable by said shiftable member to hold said gate in spaced relation to said abutment; and means disposed in the path of said hoppers for successively shifting each latch member out of engagement with said part.

10. A receptacle filling hopper unit comprising: an elongated hollow body having an article receiving end and an article discharging end; receptacle gripping means at the article discharging end of said body including opposed portions depending from said body; one of said portions being pivotally supported for movements toward and away from the other portion to respectively close and open the article discharging end of said body; an abutment carried by said body and disposed in the path of movement of said one portion away from said other portion; said movable portion having a projection thereon; latch means carried by said body and engageable with said projection for holding said movable portion out of engagement with said abutment and in an article discharging end closing position; means normally urging said movable portion toward said abutment upon release of said latching means to clamp a receptacle between said abutment and said movable portion; said latch means including a latch member pivoted to said body and having an outstanding operating arm on one side of said body; and a latch arm on the other side of said body projecting toward said movable portion; said projection on said movable portion moving into engagement with said latch arm upon closing of said article discharging end of said body.

11. A receptacle filling hopper unit comprising: an elongated hollow body having an article receiving end and an article discharging end; receptacle gripping means at the article discharging end of said body including opposed portions depending from said body; one of said portions being pivotally supported for movements toward and away from the other portion to respectively close and open the article discharging end of said body; an abutment carried by said body and disposed in the path of movement of said one portion away from said other portion; said movable portion having a projection thereon; latch means carried by said body and engageable with said projection for holding said movable portion out of engagement with said abutment and in an article discharging end closing position; means normally urging said movable portion toward said abutment upon release of said latching means to clamp a receptacle between said abutment and said movable portion; said latch means including a latch member pivoted to one side of said body adjacent said movable portion and having an operating arm projecting about said body to the opposite side thereof; a latch arm depending from said latch member adjacent its pivotal mounting; and said projection including an arm outstanding from said movable portion.

12. A receptacle filling hopper unit comprising: an elongated hollow body having an article receiving end and an article discharging end; receptacle gripping means at the article discharging end of said body including opposed portions depending from said body; one of said portions being pivotally supported for movements toward and away from the other portion to respectively close and open the article discharging end of said body; an abutment carried by said body and disposed in the path of movement of said one portion away from said other portion; said movable portion having a projection thereon; latch means carried by said body and engageable with said projection for holding said movable portion out of engagement with said abutment and in an article discharging end closing position; means normally urging said movable portion toward said abutment upon release of said latching means to clamp a receptacle between said abutment and said movable portion; said abutment comprising a member having a part projecting normal to the axis of the body; and said latch means including a lever pivotally mounted on said part of said abutment.

13. A receptacle filling hopper comprising: an elongated hollow body having an article receiving end and an article discharge end; receptacle gripping means at said discharge end including a gate pivotally supported on said body and movable between discharge end closing and discharge end opening positions; an abutment carried by said body and disposed in the path of said gate to clamp a receptacle therebetween when said gate is in said discharge end opening position; a lever pivotally carried by said body and having an operating arm and a latch arm disposed on opposite sides of said body; a projection on said gate engageable by said latch arm when said gate is in said discharge end closing position; and a spring acting on said gate to move the latter into engagement with said abutment upon release of said latch arm from said projection responsive to actuation of said operating arm.

14. Apparatus for filling receptacles, comprising: a vertically disposed hopper; means at the lower end of said hopper for supporting a receptacle; a receiver pivotally supported at the upper end of said hopper and movable from a horizontal article receiving position to an upright dumping position; means normally holding said receiver in said upright position; means for moving said hopper in a continuous path; article supply means for feeding articles to said receiver as said hopper passes said article supply means; a receiver setting cam disposed in the path of said receiver for moving the latter to said article receiving position as the hopper passes said article supply means; and a receiver dumping cam disposed in the path of said receiver as the hopper moves beyond said article supply means for allowing said receiver to move to said upright position.

15. Apparatus as defined in claim 14, wherein said receiver dumping cam includes a sharply angulated section for jogging said receiver rapidly from said upright position toward said horizontal position and permitting its return to said upright position.

16. Apparatus as defined in claim 14, including levelling means adjacent said article supply means for levelling articles in said receiver.

17. Apparatus as defined in claim 14, wherein said hopper includes a horizontally projecting wing adjacent said receiver forming a barrier alongside said receiver when the latter is in said horizontal position.

18. Apparatus for filling receptacles, comprising: a plurality of hoppers supported in side-by-side vertically extended relation; means for moving said hoppers in an endless path; each hopper comprising an article receiver tiltably supported at the upper end of the hopper for movements between a horizontally extended article receiving position and an upright article dumping position; releasable receptacle gripping means at the lower end of the hopper; latch means for releasably holding said receptacle gripping means in receptacle releasing condition; means for normally holding said latch means in a receptacle releasing condition; an operating member for said latch means to release the same upon the application of a receptacle to the lower end of said hopper; receiver setting means disposed in the path of said hoppers for moving said receiver of successive hoppers from said upright position to said horizontal position; article feeding means for delivering articles to the horizontal receivers; receiver dumping means disposed in the path of successive hoppers for positioning said receivers in said upright position to discharge articles therefrom into a receptacle at the lower end of each hopper; and receptacle discharge means disposed in the path of successive hoppers for releasing the receptacle therefrom.

19. Apparatus as defined in claim 18, wherein said receiver setting means includes a cam rail disposed in the path of said receiver and declining progressively; said cam rail extending beyond said article feeding means in the path of movement of the successive hoppers to said receiver dumping means; said receiver dumping means including a cam rail inclining from the first mentioned cam rail.

20. Apparatus as defined in claim 19, wherein said receiver dumping means also includes a sharply angulated section for jogging the successive receivers from one of its positions toward the other of its positions.

21. Apparatus as defined in claim 18, wherein said article feeding means includes a conveyor having a plurality of runs for feeding articles to a given plurality of successive hopper receivers.

22. Apparatus as defined in claim 18, wherein said article feeding means includes a conveyor having a plurality of runs for feeding articles to a given plurality of successive hopper receivers; and means for intermittently driving said conveyor in sequential relation to the location of each successive given plurality of hopper receivers in article receiving positions relative to said conveyor.

23. Apparatus as defined in claim 18, including levelling means for levelling articles in successive hopper receivers as they pass beyond said article feeding means.

24. Apparatus as defined in claim 23, wherein said levelling means includes a rotor disposed above said receivers and having resilient blades movable across said receivers upon rotation of said rotor; and means for rotating the latter.

25. Apparatus as defined in claim 18, wherein said receptacle discharge means includes a cam disposed in the path of said receptacle gripping means to release the same.

26. Apparatus as defined in claim 18, including means interposed in the path of said hoppers in advance of said receptacle discharge means and engageable with said latch means operating member to release the latch means of any hopper not released by the application of a receptacle thereto as aforesaid.

27. Apparatus as defined in claim 18, wherein said receptacle gripping means includes a gate pivoted on each of said hoppers for closing the lower end of said hoppers when said latch means is engaged therewith; and including means disposed in the path of said hoppers for closing said gate and engaging said latch means subsequent to each hopper passing beyond said receptacle discharge means to condition successive hoppers for the application of a receptacle thereto.

28. Apparatus for filling receptacles, comprising: a plurality of hoppers supported in side-by-side vertically extended relation; means for moving said hoppers in an endless path; each hopper comprising an article receiver tiltably supported at the upper end of the hopper for movements between a horizontally extended article receiving position and an upright article dumping position; releasable receptacle gripping means at the lower end of the hopper; latch means for releasably holding said receptacle gripping means in receptacle releasing condition; means for normally holding said latch means in a receptacle releasing condition; an operating member for said latch means to release the same upon the application of a receptacle to the lower end of said hopper; receiver setting means disposed in the path of said hoppers for moving said receiver of successive hoppers from said upright position to said horizontal position; article feeding means for delivering articles to the horizontal receivers; receiver dumping means disposed in the path of successive hoppers for positioning said receivers in said upright position to discharge articles therefrom into a receptacle at the lower end of each hopper; receptacle discharge means disposed in the path of successive hoppers for releasing the receptacle therefrom; and a discharge conveyor for reception of the receptacles sequentially released from said hoppers.

29. Apparatus as defined in claim 28, wherein said discharge conveyor is of the endless type and includes successive receptacle compartments; and means driving said discharge conveyor in timed relation to said hoppers.

30. Apparatus for filling receptacles, comprising: a supporting base framework; a source of power on said framework; endless carrier means on said framework driven by said power source; a plurality of hopper units each including a vertically disposed body; a tiltable receiver at the upper end of the body movable from a set position to receive articles to a dumped position for dumping said articles into said body; releasable receptacle supporting means at the lower end of said body including a gate; means for releasably latching said gate in a position bridging the lower end of said body; operating means for said latch means for releasing the same upon the application of a receptacle to said hopper unit at said receptacle applying station; said hopper units being carried by said carrier means cyclically and successively from a receptacle applying station, to a receiver setting station, to an article supplying station, to a receiver dumping station and a receptacle discharging station respectively disposed along the path of travel of said hopper units; means at said receiver setting station for moving successive receivers from a dumping position to an article receiving position; means at said article supplying station for supplying articles to successive receivers; means at said receiver dumping station for successively dumping said receivers to discharge articles therefrom in said receptacles; and means at said receptacle discharge station for releasing successive receptacle supporting means.

31. Apparatus as defined in claim 30, including means intermediate said receptacle dumping station and said receptacle applying station for shifting successive gates to said position bridging the lower ends of said hoppers.

32. Apparatus as defined in claim 30, including supporting means beneath said receptacles at said receiver dumping station.

33. Apparatus as defined in claim 30, including a receptacle jogging station between said receiver dumping station and said receptacle discharging station; and means at said jogging station for vibrating said receptacles to settle articles dumped therein at said receiver dumping station.

34. Apparatus as defined in claim 30, wherein said article feeding station includes an endless conveyor having a plurality of rows of compartments disposed thereon for a quantity of articles to be fed to said hoppers in banks.

35. Apparatus as defined in claim 30, wherein the receiver setting means at said receiver setting station extends past said article feeding station to said receiver dumping station; and including an article arranging station between said article feeding station and said receiver dumping station; said arranging station being of sufficient extent along the path of said hopper units to enable an operator to inspect the articles in successive receivers.

36. Receptacle filling apparatus comprising: a vertically disposed hopper; means for moving said hopper in a continuous path; said hopper having an open lower end; a gate pivotally connected to said hopper at its lower end and movable to a position closing said lower end of said hopper and to a position permitting the passage of articles through the lower end of said hopper; means normally urging said gate to the latter position; means cooperative with said gate for supporting a receptacle at the lower end of the hopper when said gate is in said latter position; releasable latch means automatically engageable with said gate to hold the same in the position closing the lower end of said hopper; gate closing means disposed in the path of said hopper for moving said gate to the position closing the lower end of said hopper as the hopper moves past said gate closing means; said gate closing means including a gate member on said gate; a rail pivotally mounted in the path of said gate member; and resilient means normally holding said rail in an inclined position to cam said gate closed.

37. Receptacle filling apparatus comprising: a vertically disposed hopper; means for moving said hopper in a continuous path; said hopper having an open lower end; a gate pivotally connected to said hopper at its lower end and movable to a position closing said lower end of said hopper and to a position permitting the passage of articles through the lower end of said hopper; means normally urging said gate to the latter position; means cooperative with said gate for supporting a receptacle at the lower end of the hopper when said gate is in said latter position; releasable latch means automatically engageable with said gate to hold the same in the position closing the lower end of said hopper; gate closing means disposed in the path of said hopper for moving said gate to the position closing the lower end of said hopper as the hopper moves past said gate closing means; and latch release means disposed in the path of said hopper for automatically releasing said latch means and permitting movement of said gate to the position permitting the passage of articles through said hopper.

38. A receptacle filling apparatus, comprising: a hopper for receiving articles and discharging the same into a receptacle; and means for supporting and carrying said hopper in an endless horizontal path, the improvement wherein said supporting means includes an endless chain; said hopper being connected to said chain; spaced horizontally disposed sprockets about which said chain extends in a horizontal plane; a supporting framework for said sprockets; an endless channel carried by said framework and opening vertically; said chain riding in said channel; an endless horizontal rail carried by said framework and coextensive with said chain; a support on said hopper having a roller rotatable on a horizontal axis and riding on said rail to sustain the weight of said hopper; and said chain having a plurality of interconnected links provided with rollers projecting from said links and engaged with said channel, a trackway parallel to but vertically spaced from said channel, and further roller means on said hopper engaging lateral surfaces of said trackway to prevent lateral swinging movements of said hopper.

39. Apparatus as defined in claim 38 wherein said further roller means comprises a second roller chain vertically spaced relative to the first mentioned chain and connected to said hopper; said trackway comprising a second vertically open channel in which said second roller chain rides.

References Cited in the file of this patent

UNITED STATES PATENTS

| | | |
|---|---|---|
| 1,667,930 | Edmunds | May 1, 1928 |
| 2,234,951 | Belcher | Mar. 18, 1941 |
| 2,475,617 | Irmscher | July 12, 1949 |
| 2,609,134 | Korber | Sept. 2, 1952 |
| 2,620,958 | Messina | Dec. 9, 1952 |
| 2,691,476 | Petrea | Oct. 12, 1954 |
| 2,693,067 | Williams | Nov. 2, 1954 |
| 2,753,097 | Kindseth et al. | July 3, 1956 |
| 2,973,612 | McGowan | Mar. 7, 1961 |